United States Patent
Lim et al.

(10) Patent No.: US 10,875,522 B2
(45) Date of Patent: Dec. 29, 2020

(54) METHOD FOR PREVENTING TAKEOFF OF MOTOR VELOCITY FOR HYBRID ELECTRIC VEHICLE

(71) Applicants: Hyundai Motor Company, Seoul (KR); Kia Motors Corporation, Seoul (KR)

(72) Inventors: Jae-Sang Lim, Suwon-Si (KR); Gu-Bae Kang, Yongin-Si (KR); Young-Un Kim, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 122 days.

(21) Appl. No.: 16/203,388

(22) Filed: Nov. 28, 2018

(65) Prior Publication Data
US 2019/0176805 A1 Jun. 13, 2019

(30) Foreign Application Priority Data
Dec. 12, 2017 (KR) .................. 10-2017-0170245

(51) Int. Cl.
*B60W 20/15* (2016.01)
*B60W 20/50* (2016.01)
*B60W 20/40* (2016.01)

(52) U.S. Cl.
CPC ............ *B60W 20/15* (2016.01); *B60W 20/40* (2013.01); *B60W 20/50* (2013.01)

(58) Field of Classification Search
CPC ....... B60W 20/15; B60W 20/40; B60W 20/50

USPC .......................................................... 701/22
See application file for complete search history.

(56) References Cited

U.S. PATENT DOCUMENTS

| | | | | |
|---|---|---|---|---|
| 2008/0190680 | A1* | 8/2008 | Kaneko ................... | B60L 50/16 180/170 |
| 2012/0179320 | A1* | 7/2012 | Abe ........................ | H02K 51/00 701/22 |
| 2013/0151042 | A1* | 6/2013 | Kim ...................... | G01D 5/2449 701/22 |
| 2014/0167663 | A1* | 6/2014 | Ide .......................... | H02P 21/18 318/400.09 |
| 2015/0365032 | A1* | 12/2015 | Katsumata ............ | B60L 3/0061 318/802 |
| 2016/0011267 | A1* | 1/2016 | Park ...................... | G01D 5/204 702/58 |
| 2018/0162358 | A1* | 6/2018 | Youn ..................... | B60W 10/26 |
| 2019/0118797 | A1* | 4/2019 | Lim ...................... | B60W 10/02 |

(Continued)

FOREIGN PATENT DOCUMENTS

| JP | 2011-229268 A | 11/2011 |
|---|---|---|
| KR | 2016-0000285 A | 1/2016 |

*Primary Examiner* — Yazan A Soofi
(74) *Attorney, Agent, or Firm* — Morgan, Lewis & Bockius LLP

(57) ABSTRACT

A method for preventing takeoff of a motor velocity of a hybrid electric vehicle, may include checking whether an engine clutch is disengaged while an engine and a motor are simultaneously driven, checking whether a command of motor torque is zero when the engine clutch is disengaged, and checking whether the motor velocity is normal while the command of the motor torque is zero, wherein when the motor velocity abnormally increases as a result of checking whether the motor velocity is normal, the motor torque is corrected to be zero.

5 Claims, 16 Drawing Sheets

(56) References Cited

U.S. PATENT DOCUMENTS

2019/0179320 A1* 6/2019 Pacala ................... G01S 17/89
2019/0366855 A1* 12/2019 Oh ......................... B60L 15/20

* cited by examiner

[CHANGE IN CURRENT OPERATING POINT/CHANGE
IN TORQUE BY RESOLVER OFFSET DIFFERENCE]

[CHANGE OF Vd* BY RESOLVER OFFSET DIFFERENCE]

METHOD FOR PREVENTING TAKEOFF OF MOTOR VELOCITY FOR HYBRID ELECTRIC VEHICLE

CROSS-REFERENCE(S) TO RELATED APPLICATIONS

The present application claims priority to Korean Patent Application No. 10-2017-0170245, filed on Dec. 12, 2017, the entire contents of which is incorporated herein for all purposes by this reference.

BACKGROUND OF THE INVENTION

Field of the Invention

The present invention to a method for preventing a motor velocity of a hybrid electric vehicle from being abnormally taken off.

Description of Related Art

FIG. 1 illustrates an intelligent power module (IPM) motor and a control thereof and FIG. 2 illustrates a control structure of a general IPM motor. An echo vehicle motor is used by adjusting a resolver offset by performing resolver offset correction logic at the time of mass production to adjust a production deviation as illustrated in the figure.

That is, there is an error in manufacturing and mounting a resolver for each of mass-produced motors, and it is general to find a resolver offset by software for each vehicle and compensate for the value.

FIG. 3 illustrates measured torque during zero torque control when a resolver offset is changed. As illustrated in the figure, such a torque error causes the motor to run without load and a torque command is zero, so that a motor velocity must be lowered, which may cause the motor velocity to be abnormally taken off.

However, when such a resolver offset error occurs, there is a possibility that the motor is taken off when an engine clutch is engaged and then disengaged.

In the presence of the resolver offset error, the motor torque may be generated in a positive (+) direction even in motor zero torque control in a medium velocity and in the instant case, the motor velocity is taken off and the motor is burned out.

That is, when the resolver offset correction has an error in error correction due to noise or the like, the motor torque is generated at the time of engine clutch disengagement/motor zero control, and there is a possibility of take-off of the motor velocity.

FIG. 4, FIG. 5, FIG. 6, and FIG. 7 are diagrams for more specifically describing the above contents.

As a first example, considered is a case where the motor and the engine are connected and operated, a brake is operated and the engine clutch is disengaged and both the motor velocity and an engine velocity are reduced.

As illustrated in FIG. 4, in a normal case, while the engine clutch is disengaged, the motor has no portion connected to a load and when the torque command is zero, no torque is generated. In the instant case, the velocity of the motor drops due to natural loss due to mechanical friction or the like.

However, when there is the error of the resolver offset correction as illustrated in FIG. 5, the measured torque is generated even when a zero torque command is issued and the motor in a no-load state excites the motor velocity even with small torque. In the instant case, the motor velocity is instantaneously increased because the motor is in the no-load state.

As a second example, considered is a case where the motor and the engine are connected and operated, and then the engine clutch is disengaged and the motor velocity and the engine velocity are both reduced.

In the normal case of FIG. 6, while the engine clutch is disengaged, the motor has no portion connected to the load and when the torque command is zero, no torque is generated. In the instant case, the velocity of the motor drops due to the natural loss due to the mechanical friction or the like.

However, when there is the error of the resolver offset correction as illustrated in FIG. 7, the measured torque is generated even when the zero torque command is issued and the motor in the no-load state excites the motor velocity even with small torque. In the instant case, the motor velocity is instantaneously increased because the motor is in the no-load state.

Next, when the engine clutch is disengaged and the motor is operated without load, a velocity due to a resolver offset difference in the zero torque control is illustrated in FIG. 8 and a relationship between the general motor torque and velocity may be expressed by Equation 1.

$$J\frac{dw}{dt} + Bw + TL = T \quad \text{[Equation 1]}$$

J: Motor inertia
dw/dt: Velocity change degree
B: Friction coefficient
w: Motor velocity
TL: Load torque
T: Motor torque When TL is zero, the relationship may be expressed by Equation 2.

$$\frac{dw}{dt} = \frac{T - Bw}{J} \quad \text{[Equation 2]}$$

Referring to FIG. 8 and Equations 1 and 2, the relationship may be summarized as shown in Table 1 below.

That is, in the normal case, the motor torque becomes zero and the velocity is reduced by friction B.

In Case 1, the motor velocity is taken off when the motor torque is positive (+) and the torque is greater than the friction loss.

In Case 2, the motor torque is negative (−), and as a result, the motor velocity is more sharply reduced.

TABLE 1

|  | Normal | Case1. When resolver offset is changed to negative (−) | Case2. When resolver offset is changed to positive (+) |
| --- | --- | --- | --- |
| T (in zero torque control, measured torque) | 0 | (+) torque | (−) torque |
| dw/dt (velocity change) | −B * w/J | (T − B * w)/J | (T − B * w)/J |

TABLE 1-continued

| | Normal | Case1. When resolver offset is changed to negative (−) | Case2. When resolver offset is changed to positive (+) |
|---|---|---|---|
| dw/dt when T is greater than B * w | (−) value -> motor velocity is reduced | (+) value -> motor velocity is taken off | (−) value -> motor velocity is reduced |

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for preventing takeoff of a motor velocity of a hybrid electric vehicle, which is configured for preventing abnormal takeoff of the motor velocity because a normal zero torque control is possible.

In accordance with various exemplary embodiments of the present invention, a method for preventing takeoff of a motor velocity of a hybrid electric vehicle may include: checking whether an engine clutch is disengaged while an engine and a motor are simultaneously driven; checking whether a command of motor torque is zero when the engine clutch is disengaged; and checking whether the motor velocity is normal while the command of the motor torque is zero, in which when the motor velocity abnormally increases as a result of checking whether the motor velocity is normal, the motor torque is corrected to be zero.

When the motor velocity abnormally increases as the result of checking whether the motor velocity is normal, a new resolver offset may be adapted.

Furthermore, the new resolver offset value may be acquired by adding and adapting a determined resolver offset correction value to the existing resolver offset value.

Furthermore, in respect to the resolver offset correction value, a motor velocity and a Vd* value are detected to determine a predetermined value according to the detected motor velocity and Vd* value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
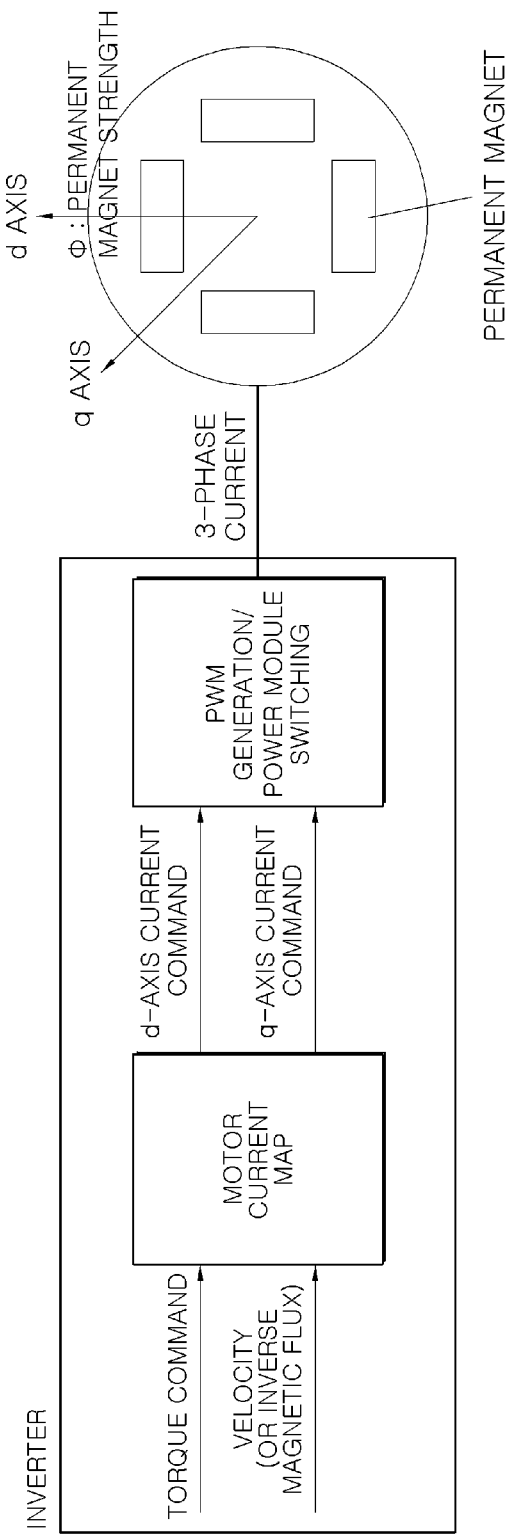
FIG. 1, FIG. 2, FIG. 3, FIG. 4, FIG. 5, FIG. 6, FIG. 7, and FIG. 8 are diagrams for describing a problem in the related art.
Figure 2:
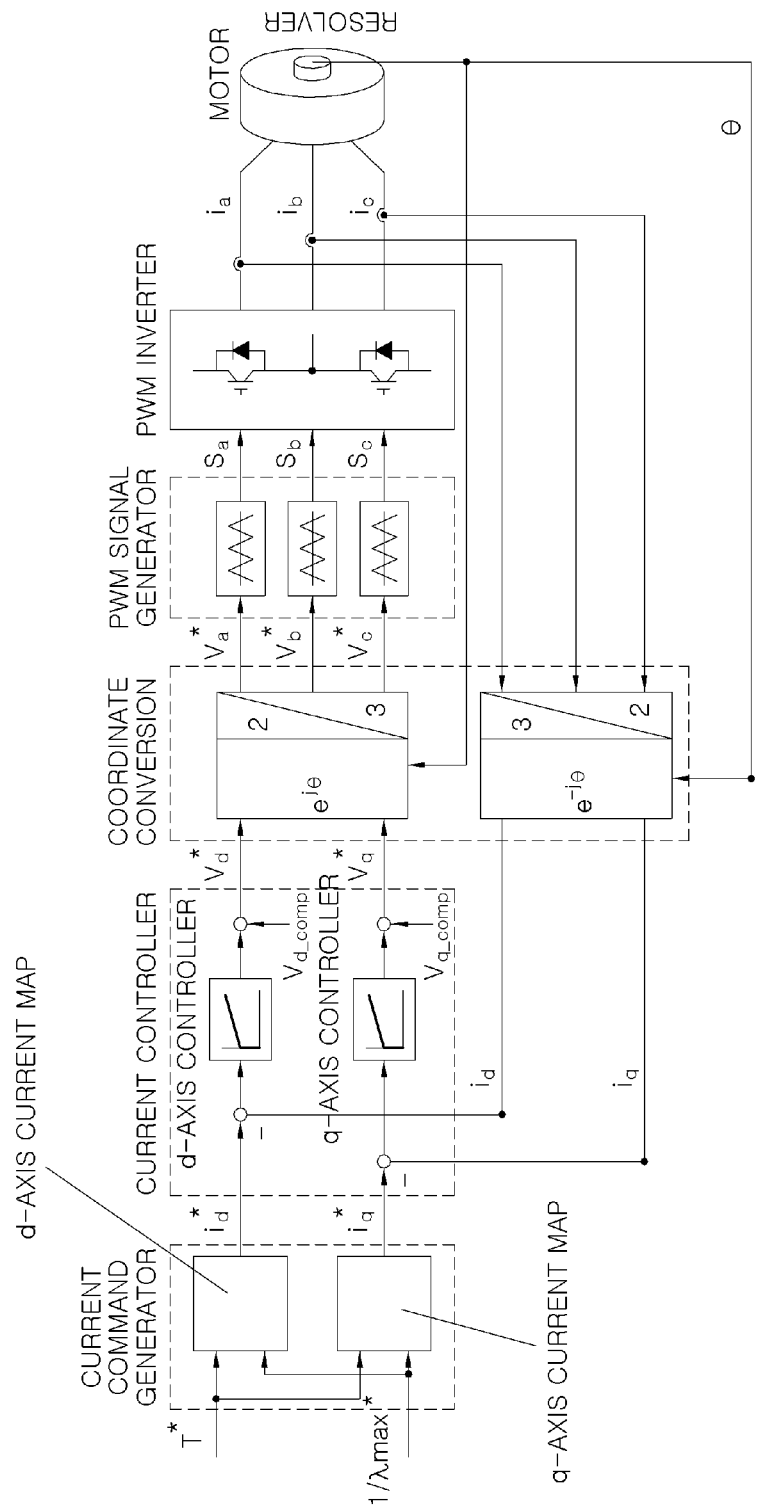
Figure 3:
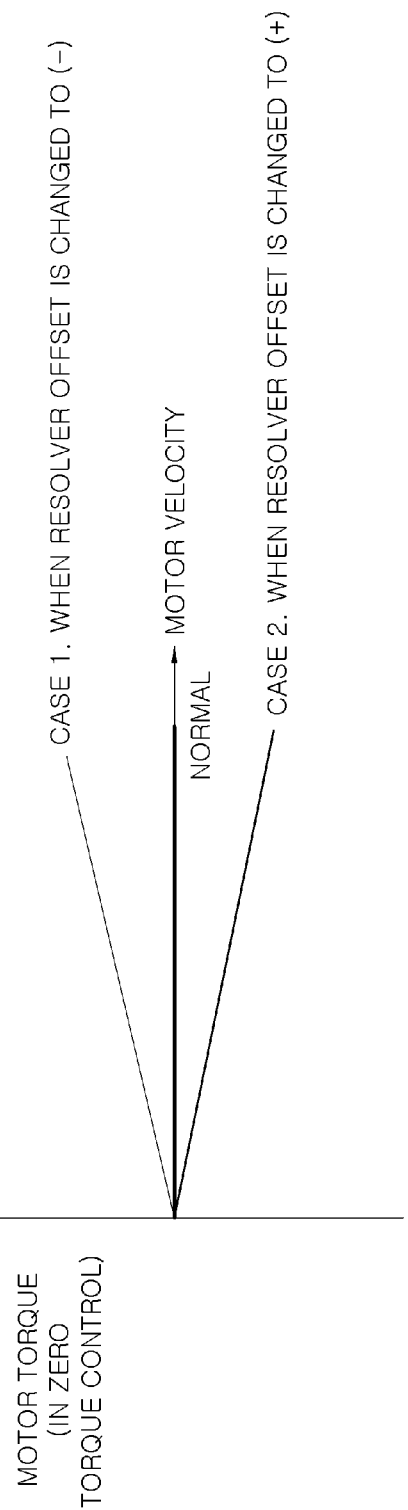
Figure 4:
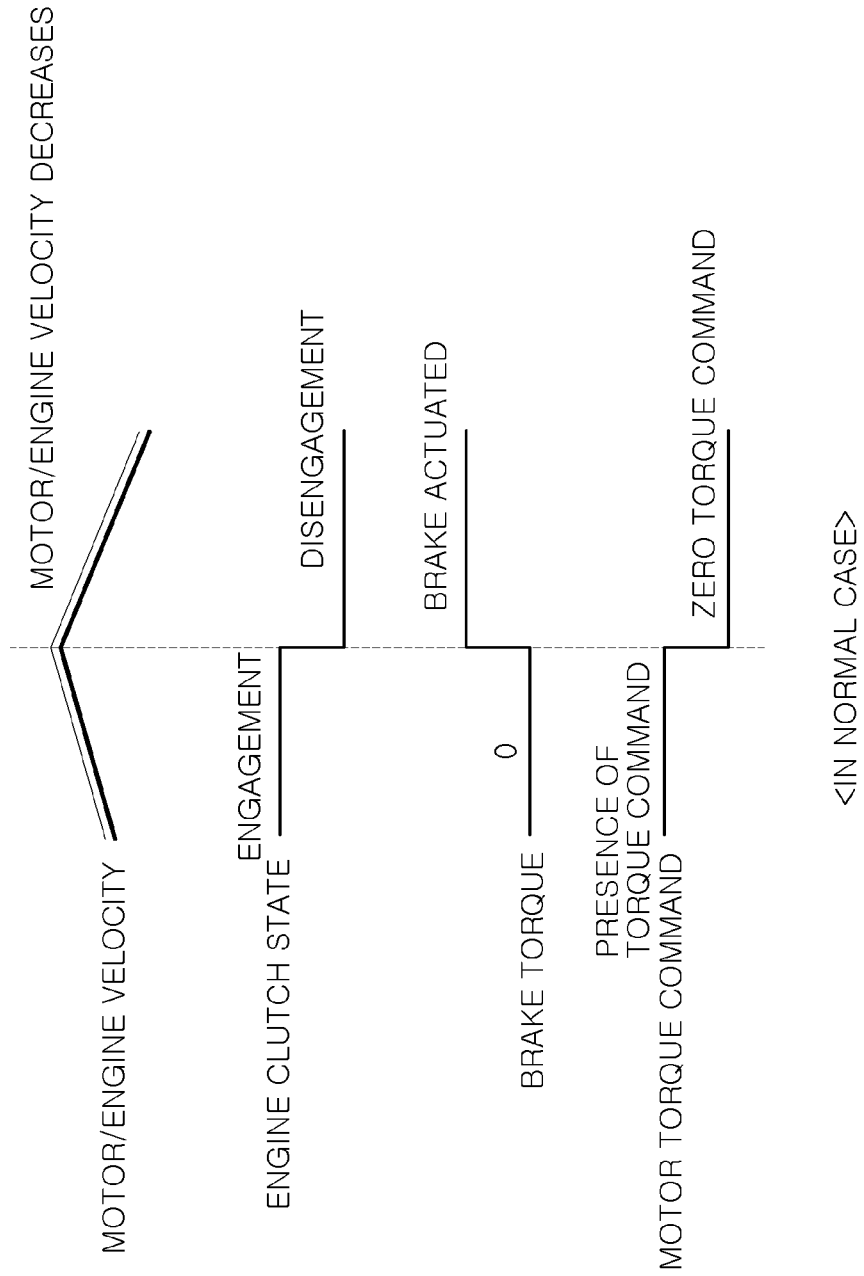
Figure 5:
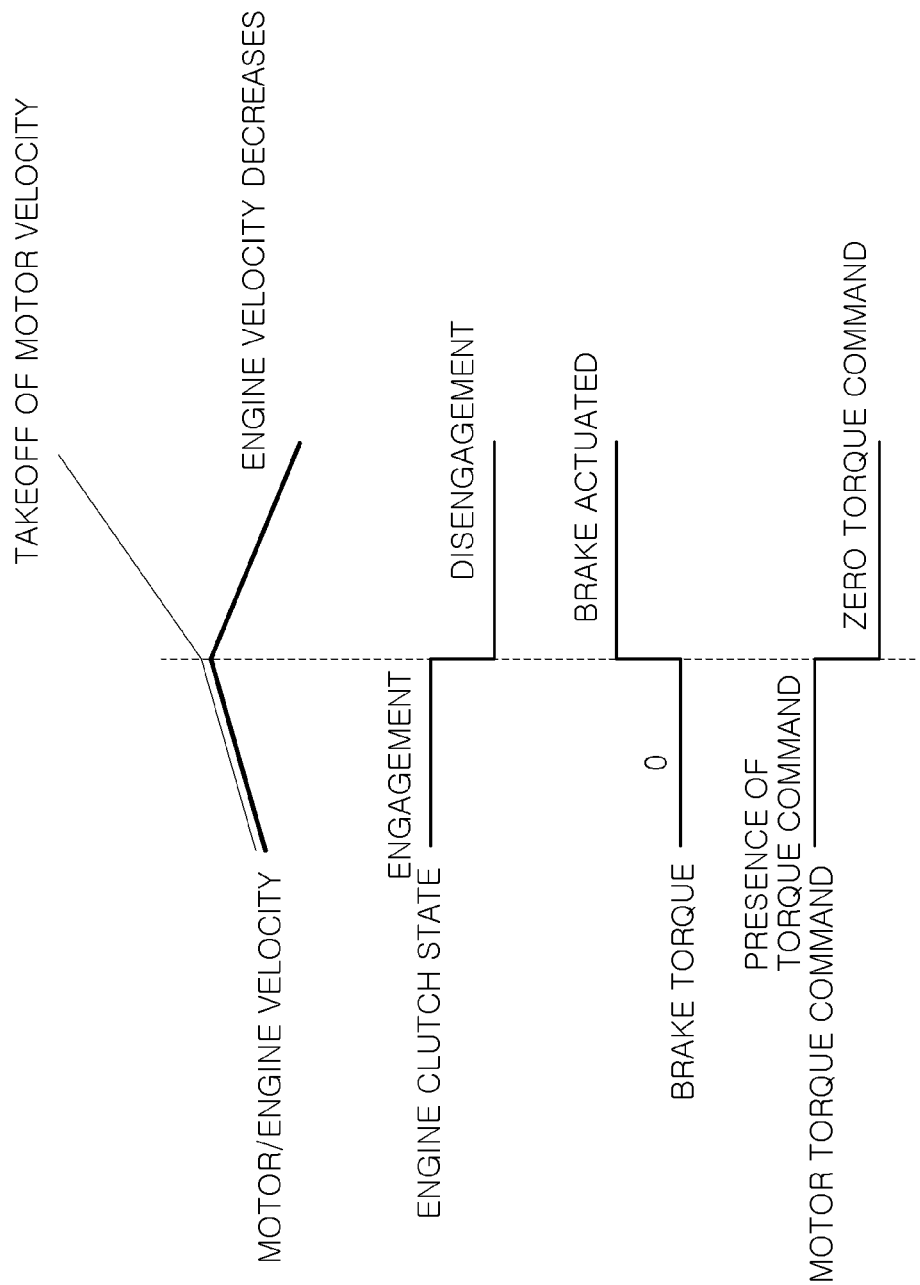
Figure 6:
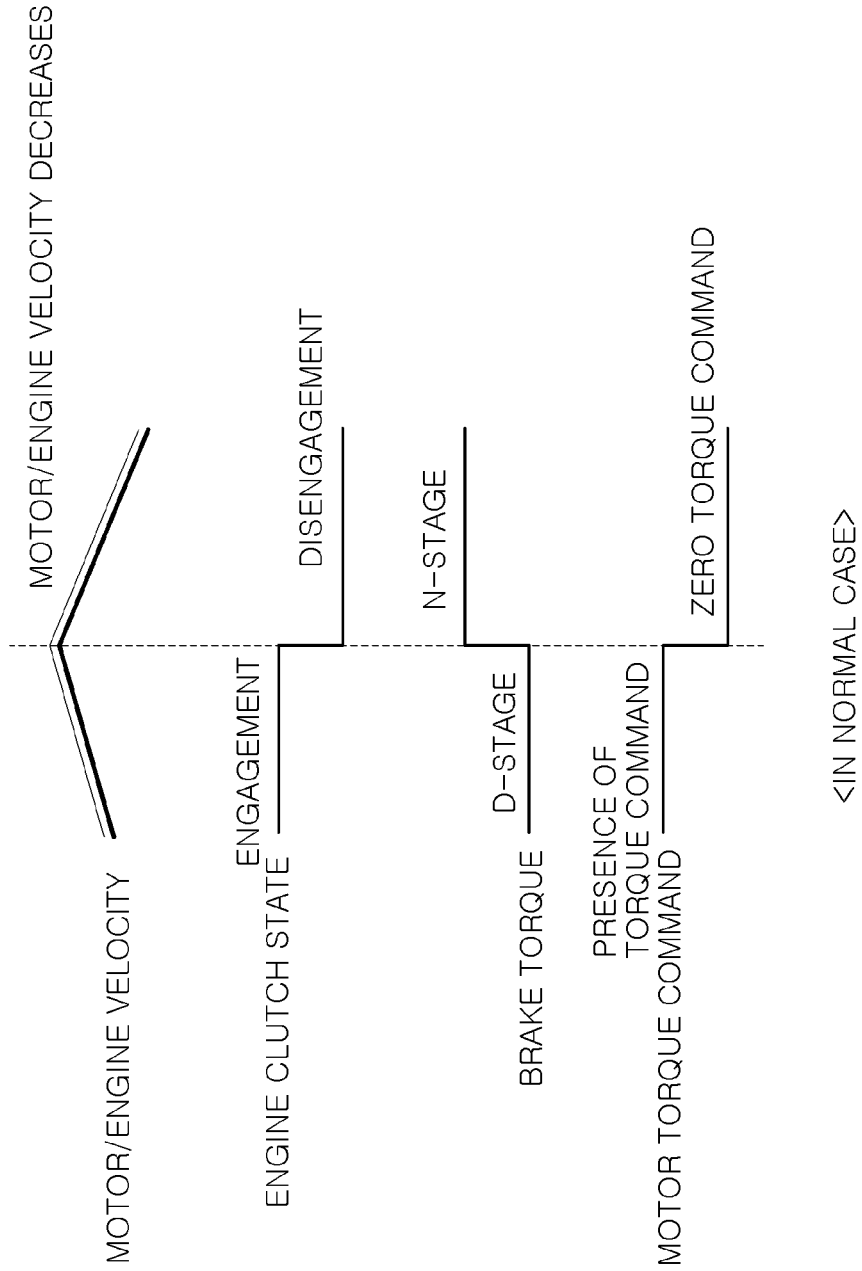
Figure 7:
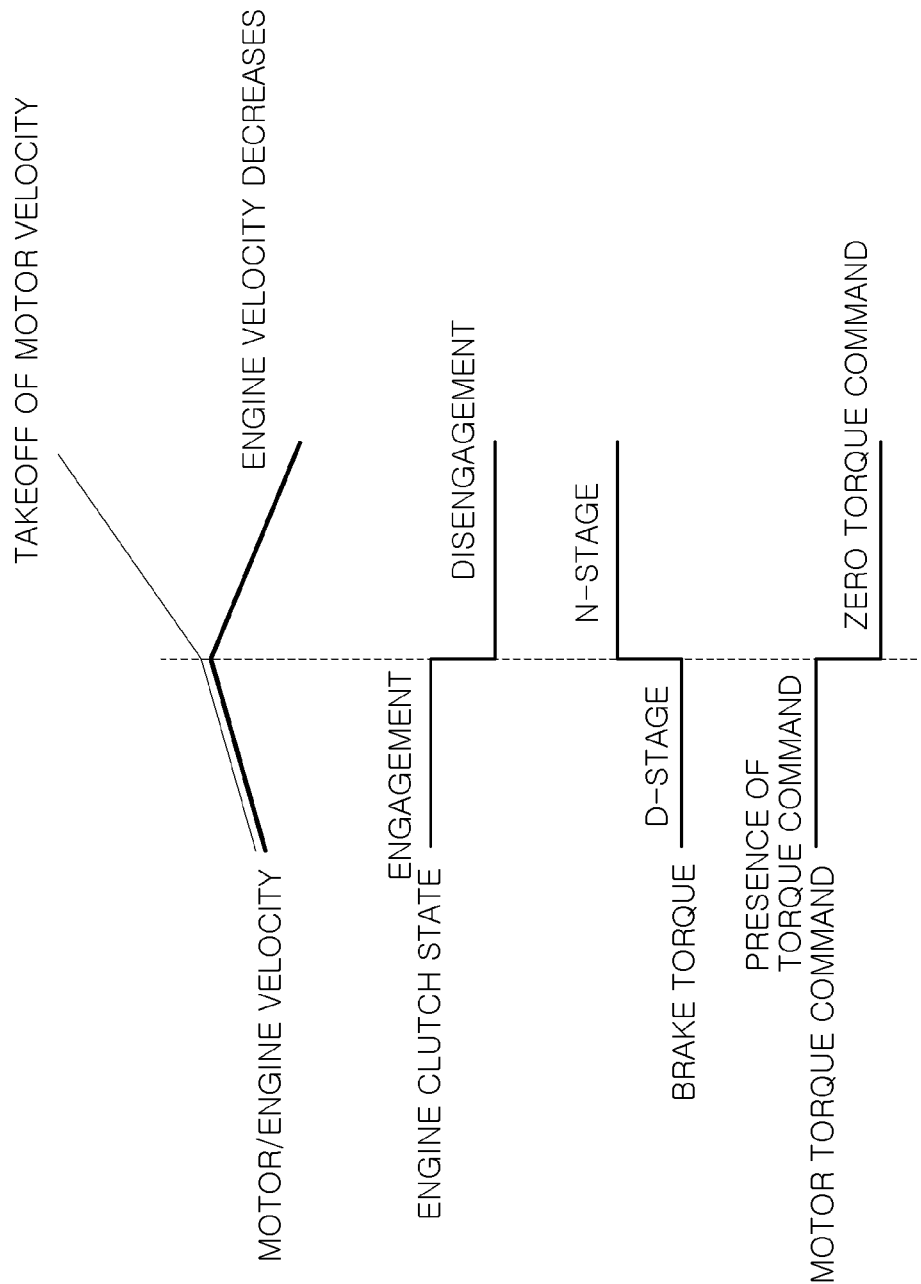
Figure 8:
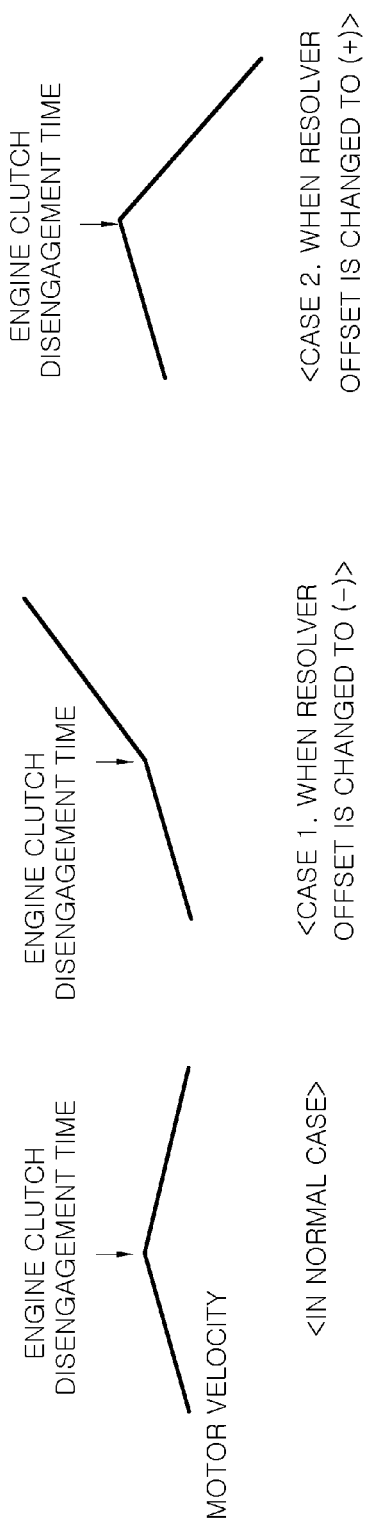

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

To sufficiently appreciate the present invention, operational advantages of the present invention, objects achieved by exemplary embodiments the present invention, accompanying drawings illustrating the exemplary embodiments of the present invention and contents included in the accompanying drawings may be referred.

In describing the exemplary embodiments of the present invention, it is to be understood that the present invention is not limited to the details of the foregoing description and the accompanying drawings.

Figure 11:
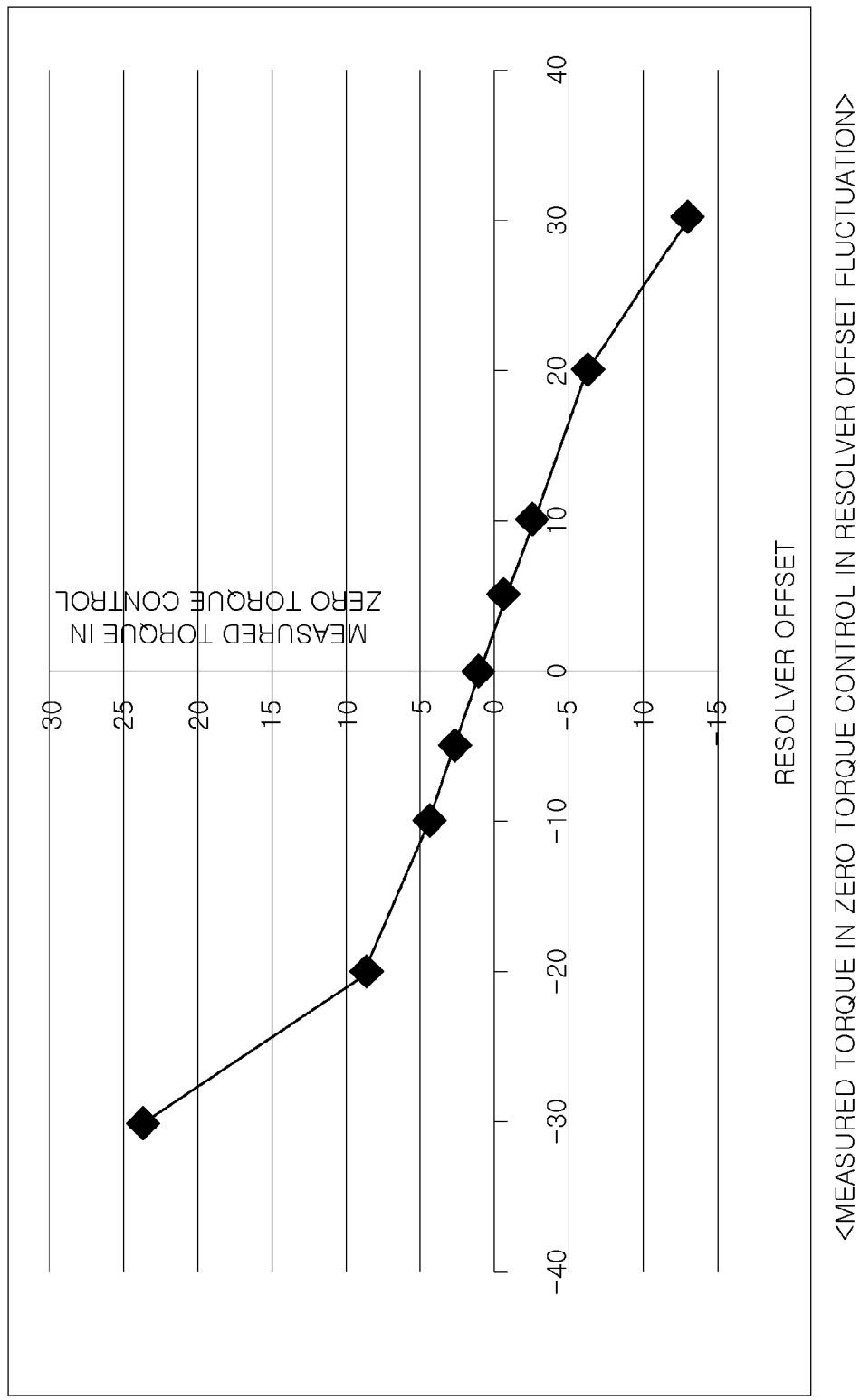
Figure 12:
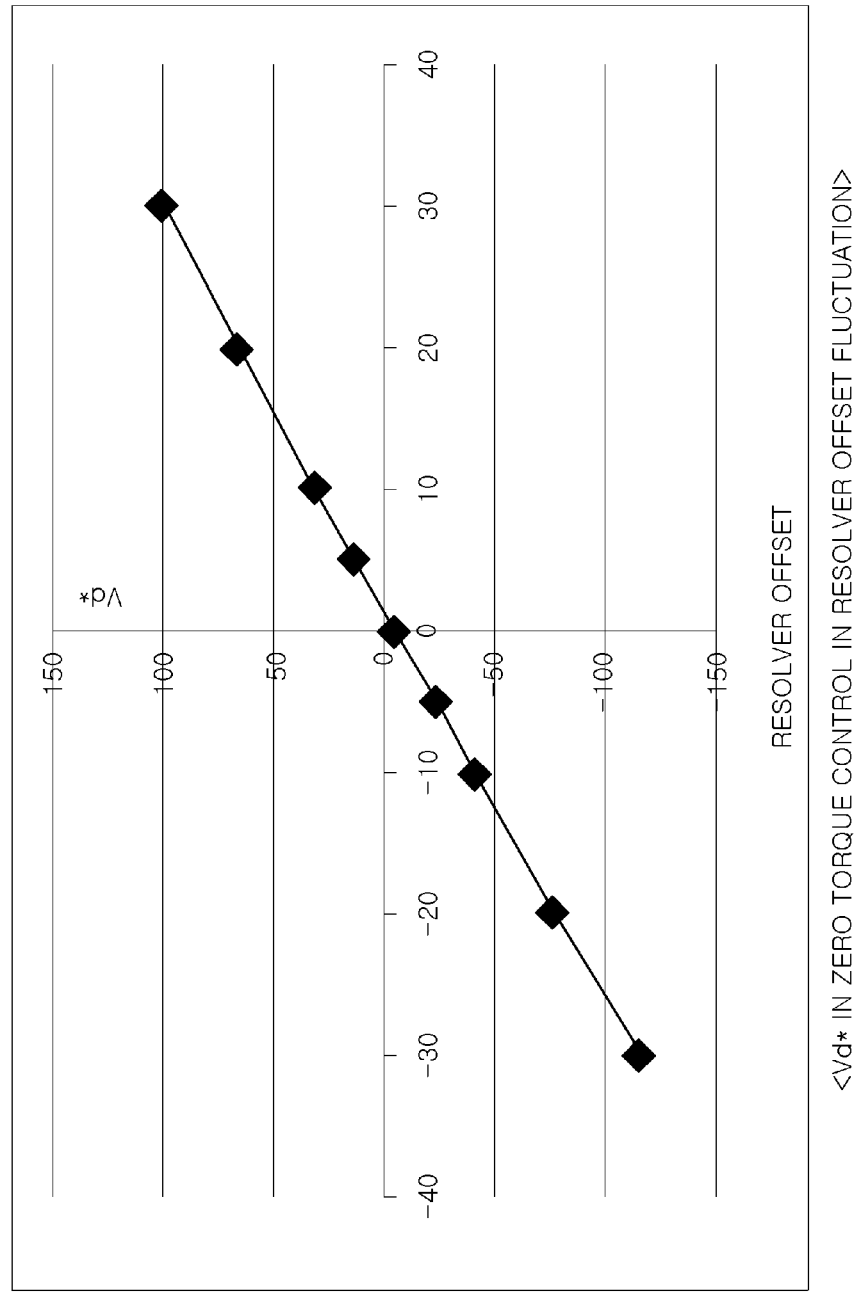
Figure 13:
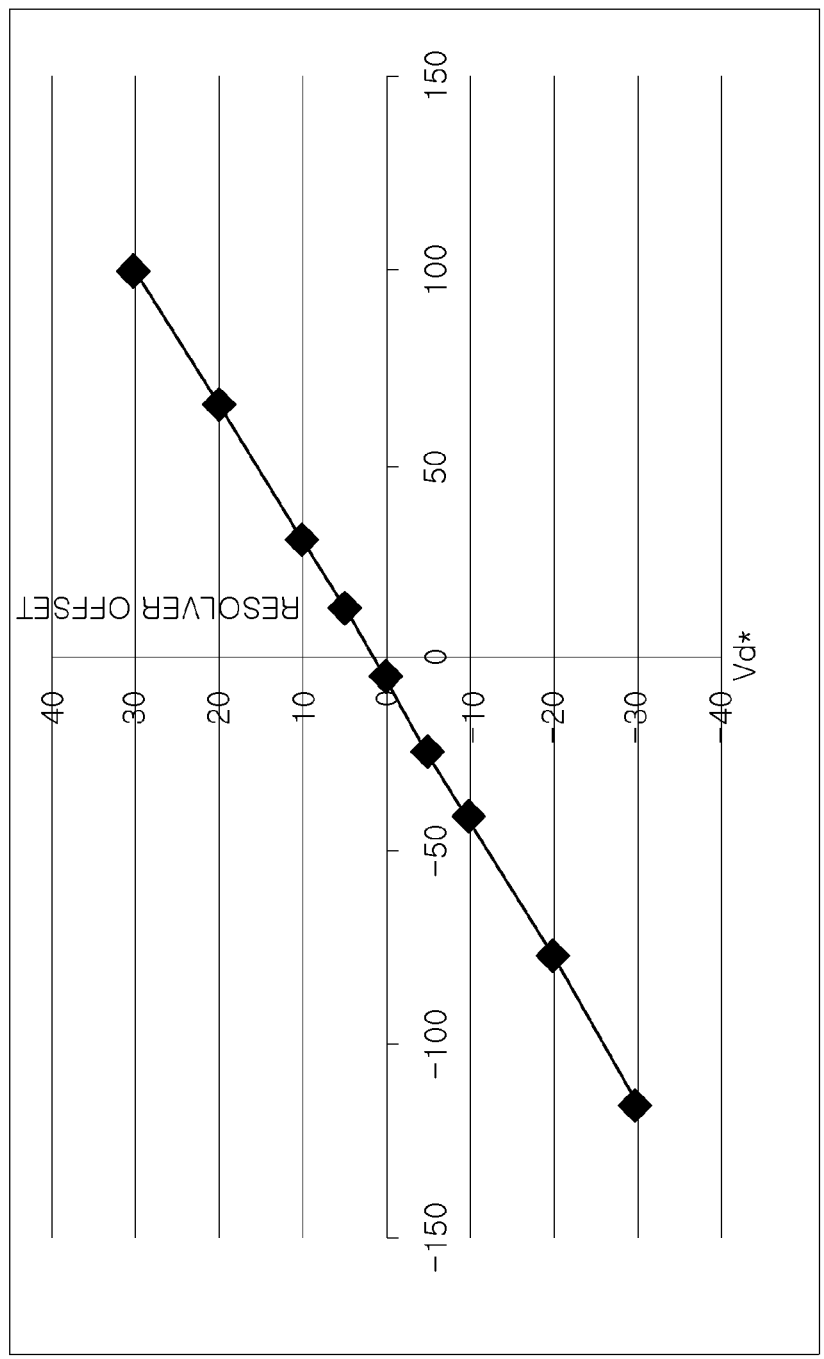
Figure 14:
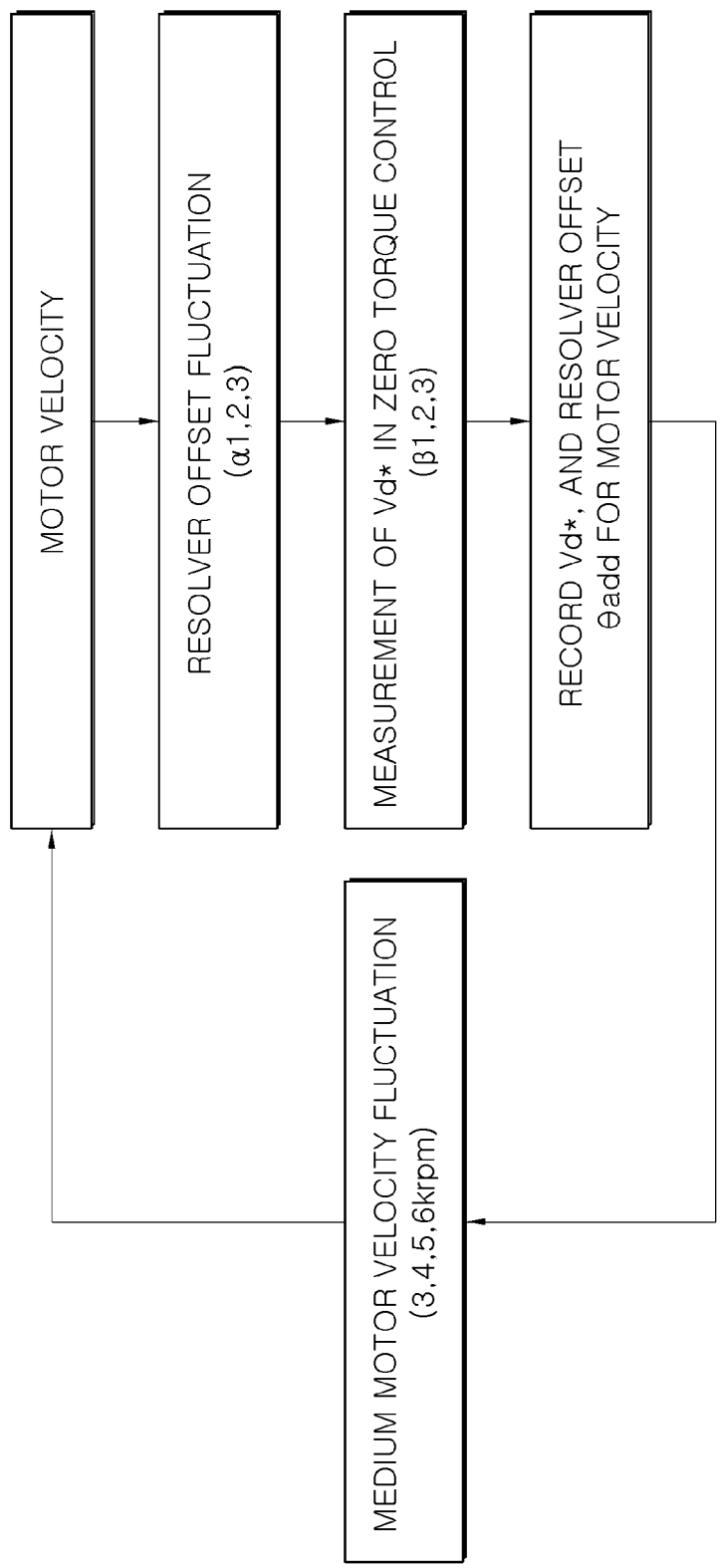
FIG. 14 illustrates a method for constructing a resolver offset fluctuation value according to an exemplary embodiment of the present invention.

FIGS. 9 to 12 are diagrams for describing a concept of a method for preventing takeoff of a motor velocity according to an exemplary embodiment of the present invention, FIG. 13 illustrates a control structure of for implementing the method of the present invention, and FIG. 14 sequentially illustrates the method for preventing takeoff of a motor velocity according to an exemplary embodiment of the present invention.

Hereinafter, a method for preventing takeoff of a motor velocity of a hybrid electric vehicle according to an exemplary embodiment of present invention will be described with reference to FIGS. 9 to 14.

First, a change of torque and Vd* (Vd command) by the resolver offset difference is described.

1) Change of current operation point and a torque by resolver offset difference

Figure 9:
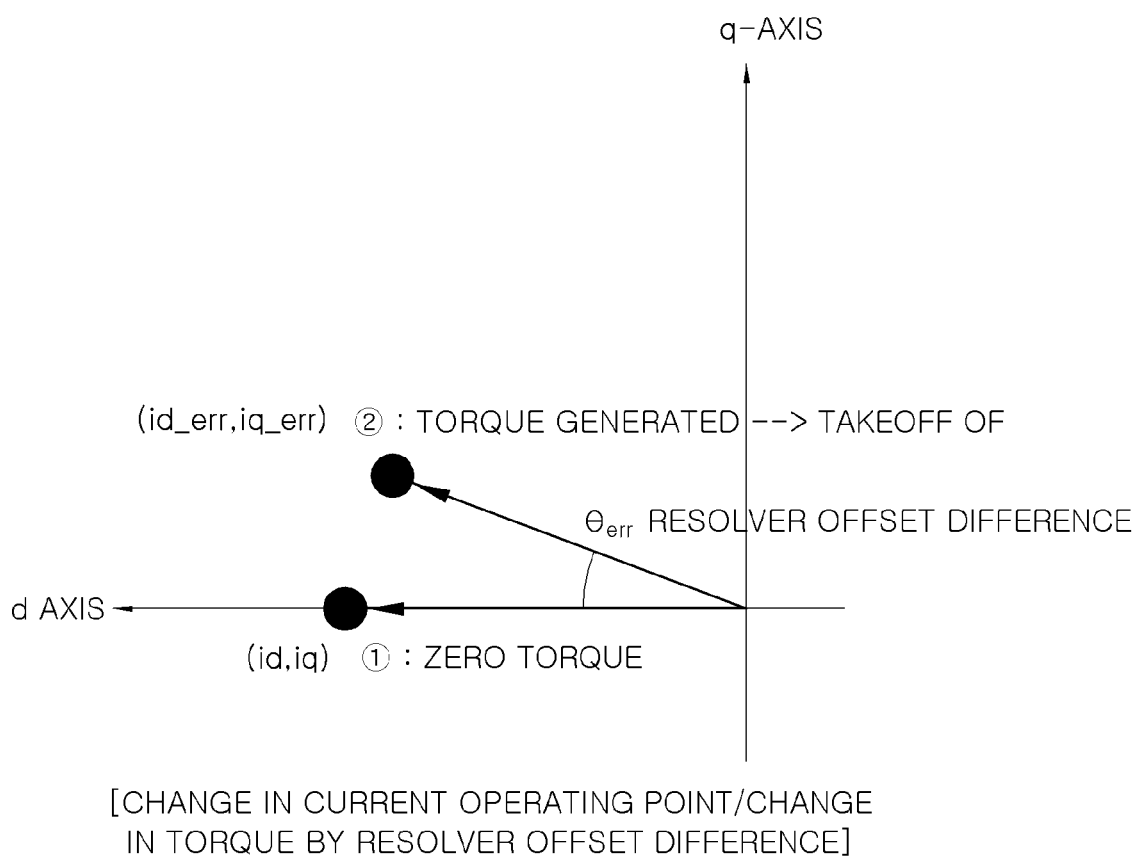
FIG. 9, FIG. 10, FIG. 11, FIG. 12, and FIG. 13 are diagrams for describing a concept of a method for preventing takeoff of a motor velocity according to an exemplary embodiment of the present invention.

In FIG. 9, when the resolver offset is normal, the current operates at an operation point ①.

However, when the resolver offset difference is as large as θerr, the current operates at an operation point ②.

As the operation point is changed, the torque fluctuates from zero torque to positive (+) torque.

Furthermore, there is also an operation point change depending on an inverse magnetic flux change (1/λ→1/λ_err).

2) Change of Vd* by resolver offset difference

Figure 10:
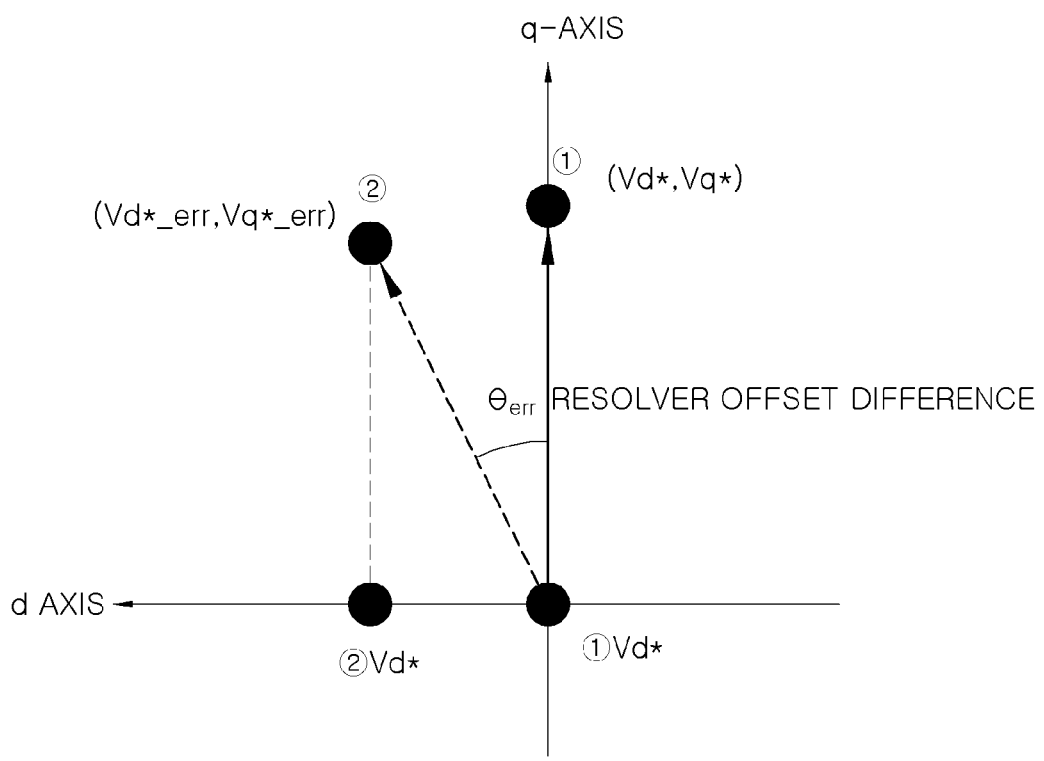

In FIG. 10, when the operation point resolver offset is normal, a vector operates at the operation point ①. In the instant case, the Vd* value is close to 0.

However, when the resolver offset difference is as large as θerr, the vector operates at the operation point ② and the Vd* value is shown.

This is summarized in Table 2 below.

TABLE 2

| | Normal | When resolver offset is changed by θerr |
|---|---|---|
| d/q axis current | $\begin{bmatrix} id \\ iq \end{bmatrix}$ | $\begin{bmatrix} id\_err \\ iq\_err \end{bmatrix} = \begin{bmatrix} \cos\theta err & \sin\theta err \\ -\sin\theta err & \cos\theta err \end{bmatrix} \begin{bmatrix} id \\ iq \end{bmatrix}$ |
| d/q axis voltage | Vd* = Rs * id − w * Lq * iq = Rs * id − w * λq<br>Vq* = Rs * iq + w * (Ld * id + Φ)<br>Rs * iq + w * λd | Vd*_err = Rs * id − w * (Lq * iq − Φ * sinθerr) = Rs * id − w * λq_err<br>Vq*_err = Rs * iq + w * (Ld * id − Φ * cosθerr)<br>Rs * iq + w * λq_err |
| λq/λd | λq = Lq * iq<br>λd = Ld * id + Φ | λq_err = Lq * iq − Φ * sinθerr<br>λd_err = Ld * id + Φ * cosθerr |
| Torque | T = (3/2) * (P/2) * [λd * iq − λq * id] | T_err = (3/2) * (P/2) * [λd_err * iq_err − λq_err * id_err] |

Variables of Table 2 are as follows.

id/iq: in the normal case, d/q axis current (id_err/iq_err: d/q axis current when resolver offset is changed)

Vd*/Vq*: in the normal case, d/q axis voltage (Vd*_err/Vq*_err: d/q voltage when resolver offset is changed)

T: in the normal case, torque (T_err: torque when resolver offset is changed)

Ld/Lq: d/q axis inductance of motor

Rs: phase resistance of motor w: motor velocity

Φ: magnetic strength of motor

λd/λq: in the normal case, d/q axis flux (λd_err/λq_err: d/q axis flux of motor when resolver offset is changed) of motor P: number of poles of motor Next, with reference to FIG. 11 and FIG. 12, the change of the measured torque and Vd* in the zero torque control according to the resolver offset fluctuation will be described.

In zero torque control (in zero torque control of PWM on interval) of medium-velocity region, when the resolver offset is changed, the current operating point is changed, and id, iq, and Lq are changed by Equation 3 below.

$$Vd^*=Rs^*id-w^*Lq^*iq \quad \text{[Equation 3]}$$

Here, Vd* represents a d-axis voltage command and Lq represents d-axis inductance.

As a result, the torque difference and Vd* difference according to the resolver offset are shown, and the measured torque and Vd* value at zero torque control due to the difference in resolver offset of the actual motor are shown as illustrated in a simulation result.

As shown in the above result, Vd* for each resolver offset is measured as illustrated in FIG. 13 to construct a table as shown in Table 3. Since Vd* varies with velocity, Vd* is also measured for each velocity to construct a 3D table.

A method of constructing the resolver offset fluctuation value with respect to Vd* in the zero torque control may be summarized as illustrated in FIG. 14, and thus the resolver offset fluctuation value θadd may be constructed from the motor velocity and the Vd* measurement value.

TABLE 3

| Items | Resolver offset fluctuation θ | Vd* |
|---|---|---|
| Normal | 0 | 0 |
| Resolver offset fluctuation 1 | α1 | β1 |
| Resolver offset fluctuation 2 | α2 | β2 |
| Resolver offset fluctuation 3 | α3 | β3 |

Figure 15:
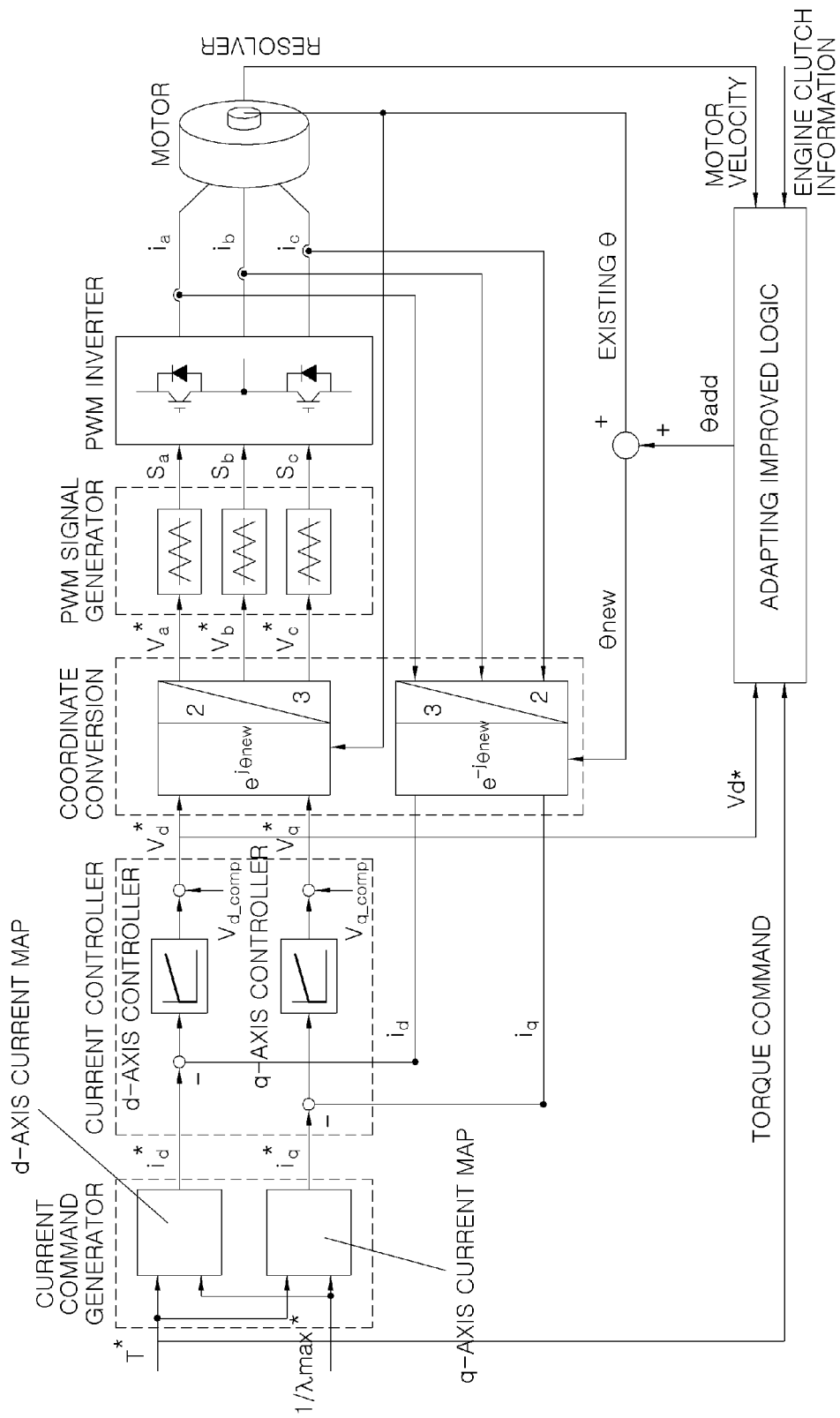
FIG. 15 illustrates a control structure of an IPM motor configured for implementing the method of the present invention.

The present invention detects Vd*, motor velocity, and a torque command through the control structure as illustrated in FIG. 15 to compensate for the fluctuation of the resolver offset, preventing the motor velocity from being taken off.

Figure 16:
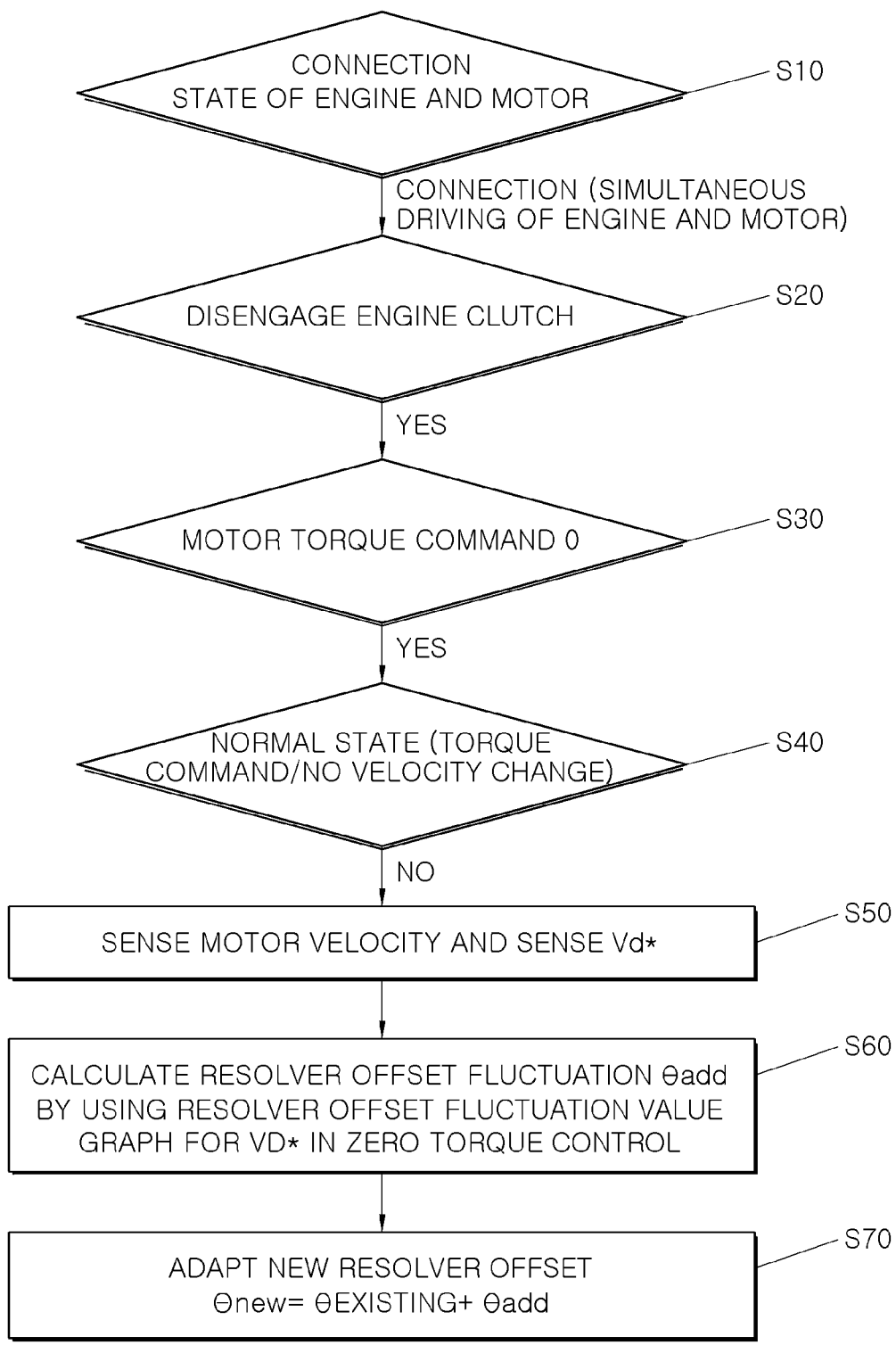
FIG. 16 sequentially illustrates the method for preventing takeoff of a motor velocity according to an exemplary embodiment of the present invention.

FIG. 16 sequentially illustrates a resultant method for preventing takeoff of a motor velocity.

Referring to FIG. 16, a state in which the engine and the motor are driven at the same time is verified (S10) and it is verified whether the engine clutch is disengaged in such a state (S20).

After confirming that the motor torque command is zero in the state where the engine clutch is disengaged (S30), it is verified whether the motor torque is in a normal state (S40).

When the motor and the engine are connected and operated and as such, the engine clutch is disengaged and the torque command is zero, the motor torque will not be generated in the normal state in which the resolver error does not occur. Furthermore, the motor velocity does not also increase, and as a result, there will be no change.

However, when it is determined in step S40 that the motor torque is generated, it may be determined that there is an error in the resolver offset correction, and the motor velocity may be taken off.

To prevent the takeoff, the motor velocity and the Vd* value are detected (S50).

In an exemplary embodiment of the present invention, the resolver offset fluctuation value θadd constructed from the motor velocity detected and the Vd* value at S50 is determined by predetermined data at table 3 (S60) and the determined θadd is reflected and added to correct the resolver offset fluctuation value to a new resolver offset value (S70).

According to an exemplary embodiment of the present invention, the resolver offset error is corrected in real time by such a control method to disengage the engine clutch and when the motor torque command is 0, the motor torque becomes zero, preventing the takeoff of the motor velocity.

Table 4 summarizes the simulation result when the present invention is applied in the case of resolver offset fluctuation of 30 degrees.

TABLE 4

| Items | Resolver offset fluctuation θerr 30 degrees | In application of improved logic |
|---|---|---|
| Torque command [Nm] | 0 | |
| Motor velocity [rpm] | 4000 | |
| Vd* | −74 | −2.7 |
| Measured torque [Nm] | 6.7 | 0.3 |
| In clutch disengagement | Takeoff of motor velocity | No takeoff of motor velocity |

By a method for preventing takeoff of a motor velocity of a hybrid electric vehicle of the present invention, an error of a resolver offset is detected to correct the resolver offset and motor torque is made to zero when a clutch is disengaged, preventing abnormal takeoff of the motor velocity by the resolver offset correction error and preventing a motor from being damaged.

Furthermore, this is enabled without changing hardware to be adapted in a vehicle without additional cost.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for preventing takeoff of a motor velocity of a hybrid electric vehicle, the method comprising:
   verifying when an engine clutch is disengaged while an engine and a motor are driven;
   verifying when a command of motor torque is zero while the engine clutch is verified to be disengaged; and
   verifying when the motor velocity is normal while the command of the motor torque is verified to be zero,
   wherein, when the motor velocity abnormally increases while the motor velocity is verified to be normal, the motor torque of the motor is corrected to be zero.

2. The method of claim 1, wherein when the motor velocity abnormally increases while the motor velocity is verified to be normal, a new resolver offset value is acquired.

3. The method of claim 2, wherein the new resolver offset value is acquired by adding a predetermined resolver offset fluctuation value to an existing resolver offset value.

4. The method of claim 3, wherein the motor velocity and a d-axis voltage command value are detected to determine the predetermined resolver offset fluctuation value according to the detected motor velocity and the detected d-axis voltage command value.

5. The method of claim 4, wherein the d-axis voltage command value is determined based on the motor velocity according to an equation of:

$$Vd^* = Rs^*id - w^*Lq^*iq$$

wherein, Vd* is the d-axis voltage command, Rs is phase resistance of the motor, id is d-axis current, w is the motor velocity, Lq is d-axis inductance, and iq is q-axis current.

* * * * *